T. HANLEY.
Lawn-Edge Mower.
No. 220,829. Patented Oct. 21, 1879.
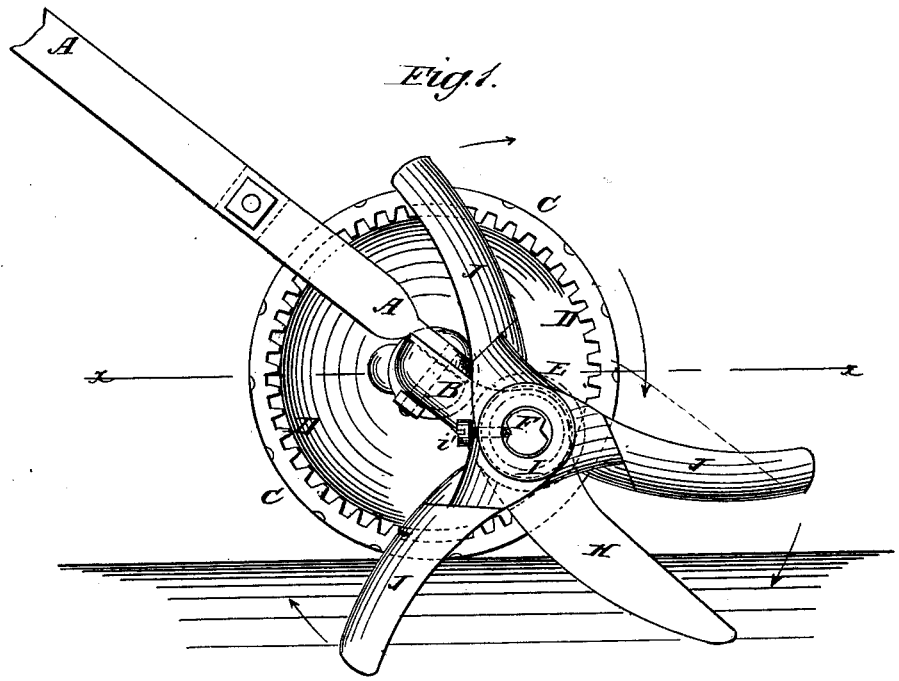
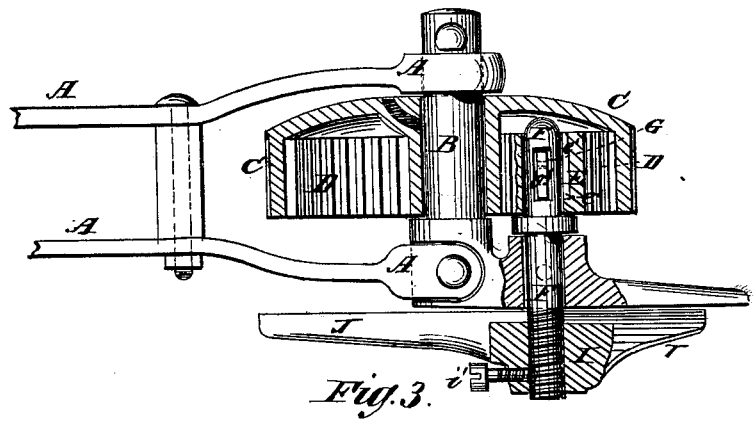
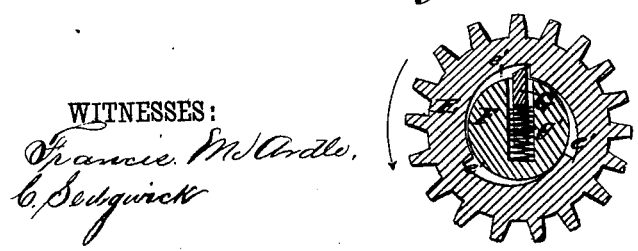
WITNESSES:
Francis McArdle,
C. Sedgwick
INVENTOR:
T. Hanley
BY
Munn & Co.
ATTORNEYS.

UNITED STATES PATENT OFFICE.

TIMOTHY HANLEY, OF BOSTON HIGHLANDS, MASSACHUSETTS.

IMPROVEMENT IN LAWN-EDGE MOWERS.

Specification forming part of Letters Patent No. 220,829, dated October 21, 1879; application filed January 14, 1879.

*To all whom it may concern:*

Be it known that I, TIMOTHY HANLEY, of Boston Highlands, in the county of Suffolk and State of Massachusetts, have invented a new and useful Improvement in Lawn-Edge Mowers, of which the following is a specification.

Figure 1 is a side view of my improved machine. Fig. 2 is a top view of the same, partly in section, through the line $x\,x$, Fig. 1. Fig. 3 is a detail section of the small gear-wheel and its shaft and pawl.

Similar letters of reference indicate corresponding parts.

The object of this invention is to furnish an improved machine for mowing the edges or borders of lawns, flower-beds, &c., which shall be simple in construction and convenient and effective in use.

The invention consists in an edge-mower formed by the combination of the main axle, the dish-shaped driving-wheel provided with internal gear-teeth, the small gear-wheel provided with internal ratchet-teeth, the pawl and spring, the second axle provided with a mortise to receive the pawl and spring, the stationary knife formed upon the base of the main axle, and the hub and knives with each other and with a handle, as hereinafter fully described.

A is the handle of the machine, which may be made of any desired or convenient form. The forward part of the handle A is forked or made in two parts, one end being bolted to the base of the axle B, and its other end being placed upon the forward end of the said axle, and secured by a linchpin or nut.

Upon the axle B revolves the hub of the drive-wheel C, the face of which is made wide, and is corrugated or roughened to prevent it from slipping upon the sod.

The wheel C is made dish-shaped or open upon one side, as shown in Figs. 1 and 2, and upon the inner surface of its flange or tread are formed, or to it are attached, gear-teeth D, into which mesh the teeth of the small gear-wheel E.

The gear-wheel E revolves upon an axle, F, and has three (more or less) ratchet-teeth, $e'$, formed in the inner surface of its hub, to engage with the pawl G, placed in a mortise in the axle F, so that the said gear-wheel E may carry the said axle F with it in its revolution when the machine moves forward, but not when the machine moves to the rearward.

The inner end of the pawl G is notched to receive a spiral spring, $g'$, the inner end of which rests upon the bottom of the mortise in the axle F, so as to hold the pawl G out against the inner surface of the hub of the gear-wheel F, and cause it to engage with the ratchet-teeth $e'$ of the said wheel F. The rear side of the outer end of the pawl G is beveled, to cause it to slide more easily over the ratchet-teeth $e'$ of the gear-wheel E.

The axle F revolves in a bearing in the base of the knife or cutter H, formed upon the base of the axle B. Upon the outer end of the axle F is cut a screw-thread upon which is screwed a hub, I, which is locked in place by a set-screw, $i$, passing in through the said hub, and entering one or another of the grooves formed longitudinally in the said axle.

To the hub I are attached, or upon it are formed, three (more or less) radial knives, J, which move past the stationary knife H as the machine is moved forward, so that the grass may be cut between the said knives H J.

With this construction the knives may be adjusted to mow a higher or lower edge or border by varying the inclination at which the handle A is held.

With this construction, also, the convexity or bulge of the middle part of the driving-wheel C balances the weight of the operating mechanism, and causes the machine to work squarely.

I am aware that it is not broadly new to rotate one cutter against a stationary or fixed cutter, or to operate a mower by mechanism substantially as described, or to lock a hub to its axle or shaft by a set-screw; but What I do claim as new and of my invention is—

An edge-trimmer for lawns in which are combined the axle B, driving-wheel having internal teeth, D, gear-wheel having internal ratchet-teeth, $e'$, the pawl and spring G $g'$, the mortised axle F, the knife H, fixed on axle, and the knives I J on rotary hub, all arranged and adapted to operate, in connection with handle A, as shown and described.

TIMOTHY HANLEY.

Witnesses:
MARY E. COLLINS,
LILLA A. CAREY,
PATRICK A. COLLINS.